United States Patent [19]

Hundebol

[11] Patent Number: 4,605,370
[45] Date of Patent: Aug. 12, 1986

[54] METHOD AND APPARATUS FOR BURNING AWAY ORGANIC COMPONENTS IN RAW PHOSPHATE

[75] Inventor: Soren Hundebol, Copenhagen, Denmark

[73] Assignee: F. L. Smidth & Co. A/S, Denmark

[21] Appl. No.: 652,329

[22] Filed: Sep. 19, 1984

[30] Foreign Application Priority Data

Sep. 28, 1983 [DK] Denmark ............................... 4433/83

[51] Int. Cl.⁴ .............................................. F27B 15/00
[52] U.S. Cl. .......................................... 432/14; 432/58
[58] Field of Search ....................... 432/14, 15, 58, 106

[56] References Cited

U.S. PATENT DOCUMENTS

| | | | |
|---|---|---|---|
| 2,670,193 | 2/1954 | Pyzel | 432/15 |
| 3,995,987 | 12/1976 | MacAskill | 432/15 |
| 4,025,295 | 5/1977 | Touborg | 432/15 |
| 4,504,319 | 3/1985 | Wolter et al. | 432/14 |
| 4,514,170 | 4/1985 | Kupper | 432/14 |

Primary Examiner—John J. Camby
Attorney, Agent, or Firm—Brumbaugh, Graves, Donohue & Raymond

[57] ABSTRACT

In a method and an apparatus for burning away organic components in raw phosphate, the burning taking place in two stages carried out in two reactors each having its separate air supply. A first suspension transport reactor (3) and a second reactor (5) are coupled in series via a separator (4), to which reactors combustion air (9), (11), preheated raw material (14), (15) and, if desired, fuel (8) are supplied separately. The reaction temperature in both reactors preferably lies in the range 700°–850° C. The majority of the organic components are burnt in the first stage which operates with a suspension having a density of 1–50 kg/m³. The remaining part of the organic components is burnt in the second stage which operates with a suspension density of 75–1600 kg/m³, a material retention time which is at least 4, preferably 10 times as long as the material retention time in the first stage, an air supply which is less than half the air supply for the first stage, and an oxygen percentage which is at least twice that of the first stage.

9 Claims, 1 Drawing Figure

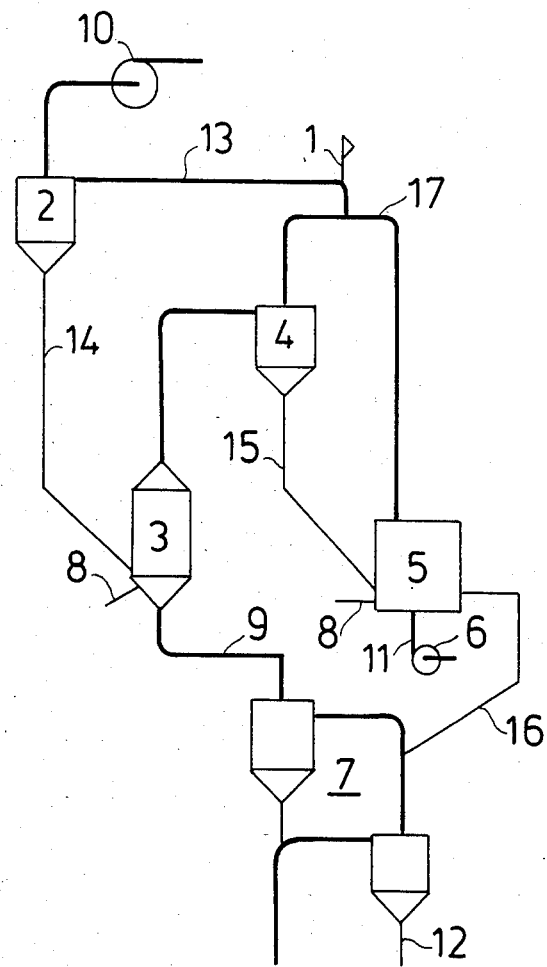

METHOD AND APPARATUS FOR BURNING AWAY ORGANIC COMPONENTS IN RAW PHOSPHATE

The invention relates to a method and an apparatus for calcining raw phosphate, i.e. burning away organic components and expulsion of $CO_2$ by burning in suspension, being particularly suited for treating raw phosphate containing organic components in an amount which may prevent it from being used directly, e.g. for the production of phosphoric acid according to the wet process.

It is known to remove such components through calcination and to use their calorific value as a considerable contribution to the amoun of calories necessary for drying and heating the raw material, which is usually carbonate-apatite.

Such known methods may involve calcining in fluid-bed reactors where the calcining takes place in two stages in fluid-bed reactors, see e.g. U.S. Pat. No. 3,995,987, or calcining in one stage in a suspension transport reactor, see, e.g. FR No. 2486924.

The use of fluid-bed reactors for the entire calcination entails, however substantial capital investment in equipment, and calls for large power consumption to surmount the heavy pressure losses arising during the process, whereas the use of one-stage suspension reactor plants, in spite of cheaper initial and working costs, entails a risk that the calcined product contains sulphide, formed upon reduction of sulphurous minerals, and also of various metal ions occuring at a low oxidation level. A calcined product having a high sulphide and additionally containing other reducing compounds, is poorly suited for producing phosphoric acid according to the wet process as the reducing compounds may cause corrosion on vital parts in a phosphoric acid plant.

Consequently, it is the object of the invention to devise a method and an apparatus for burning organic components in raw phosphate, particularly carbonate-apatite, in which the above drawbacks are eliminated.

According to the invention, a method of burning away organic components in phosphate raw material is characterized in that the burning takes place in two stages each having its separate air supply, in which the raw material in the first stage is suspended in and entrained by a first air/gas stream having a velocity of 2-10 m/sec. to form a first suspension having a density of 1-50 $kg/m^3$, to which fuel, if desired, is supplied, so that the majority of the organic components are burnt, the material treated in the first stage subsequently being separated from the gas stream and passed to the second stage and suspended in a second air/gas stream having a velocity of 0.05-15 m/sec to form a second suspension haing a density of 75-1600 $kg/m^3$, to which fuel, if desired, is supplied, whereafter the material treated in the second stage is discharged as a product; in that the ratio between the amount of air introduced into the first stage and the amount passed to the second stage is higher than 2, preferably 3; in that the material retention time in the second stage is at least 4, preferably 10, time as large as the material retention time in the first stage; and in that the weight ratio raw material/air supplied to the first stage is within the range 1-4, while the corresponding ratio for the second stage is within the ratio 2-30, preferably 3-20.

By dividing the burning into two stages there is achieved faster burning of the main part of the organic material in the first stage, whereas the remaining slower burning may be carried out in a reactor having a volume which is far smaller than that of a one-stage reactor. It is a characteristic feature of the invention that the main part of the spent air is sent to the first stage where the material retention time is short and the pressure loss low, so that the power consumption for suspension of the material is extremely low. Only a minor amount of air passes to the second stage having a longer material retention time and a larger pressure loss, which entails the power consumption at the second stage being much lower than what would be demanded if the process were to be carried out in one stage.

The removal of sulphide and other reducing compounds also presupposes the presence of oxygen, and if the calcining may take place in an atmosphere having a high oxygen percentage the decomposition of sulphide is accelerated. If a given sulphide removal were thus to take place in one reactor the reactor would partly have to operate with a high oxygen percentage, which impairs the heat economy, and partly have to be of considerable size. According to the invention the above drawbacks are elminated by carrying out the process in two stages using two calciners or reactors of comparatively modest size.

The raw material used for the method according to the invention is particulate raw phosphate, preferably with a maximum average size of 3 mm, in particular with a degree of fineness of 1-0.05, where a particulate material is said to have the degree of fineness x when it yields 50 weight % sieve residue on an x mm mesh sieve.

Preferably, the mew method is characterized in that the reaction temperature lies within the range 700°-850° C. in each of the two stages, and that the first stage operates with an oxygen percentage in the exit gas of 0-4 and with a smaller air surplus than the second stage in which the oxygen percentage in the exit gas is at least twice the percentage in the first stage.

The exit gas flow from each of the two stages may be used for drying and preheating the raw material supplied to the plant prior to the material being passed to the first reactor stage.

The invention also includes apparatus for carrying out the new method, the apparatus comprising two series-coupled reactors provided with ducts for supplying fuel, combustion air and preheated material to the reactors, of which the first reactor is a suspension transport reactor for carrying out the first stage, and the second reactor is a suspension reactor for carrying out the second stage; a material separator for separating the product treated in the first reactor; a cooler coupled to the second reactor for cooling the treated material; and a pipe for removing the material treated in the second reactor.

As first stage reactor may particularly be used calciners of the type formed as a tube-shaped reactor with vertical shaft and conical bottom, which at the bottom is equipped with pipes for supplying fuel and preheated material and an axially arranged air supply pipe, and which at its top is provided with a pipe for transferring the suspension to the material separator.

As second stage reactor may particularly be used fluid-bed and spouted-bed reactors.

The invention will now be explained in more detail by reference to the accompanying drawing which show diagrammatically an example of a two-stage calcining plant according to the invention.

The plant has first and second reactors 3,5, which are series-coupled. The first reactor 3 is a suspension transport or "flash"-calciner with short material retention time with supplies of combustion air, raw material and fuel at or near the bottom. Raw material is supplied via a pipe 14, combustion air through a pipe 9 from a cooler 7 which is coupled after the second reactor 5, and which in the example shown is a cyclone cooler, while solid, flowing or gaseous fuel is supplied via a burner 8. The reactor 5 is a fluid-bed reactor with a material supply 15, a fuel supply 8, a material outlet 16 and a fan 6 for blowing in air through a pipe 11. Particulate raw material is fed to the plant at an inlet 1 and is preheated in a pipe 13 and a cyclone 2 by calciner exit gases supplied via a pipe system 17. A fan 10 draws the air/gas stream through the plant. The finished calcined product is discharged from the plant at an outlet 12.

During the process the preheated and dried raw material, carbonate-apatite raw phosphate, is fed to the first reactor 3 to be heated therein to a calcining temperature of 700°-850° C., at which the majority of the organic components contained in the raw material are burnt away. According to the invention the retention time of the material in the first reactor is relatively short and limited to 1.5-4 seconds. The reactor 3 operates with a low oxygen percentage of 0-3, and therefore with a limited air surplus, which is regulated by means of the fan 10. From the reactor 3 the hot material containing a residual amount of organic components and a smaller amount of sulphide formed in the first stage is passed via a separator 4 to the fluid-bed reactor 5 having a relatively long material retention time of at least four times the material retention time in the first reactor 3. The reactor 5 operates with a high oxygen percentage, which in practice is at least twice as high as the oxygen percentage in the reactor 3, and in a similar temperature range of 700°-850° C. The high oxygen percentage is achieved as the majority of the organic material is already burnt out, and because the treated material at its introduction into the reactor 5 already has a high temperature, resulting in a low oxygen consumption for combustion of fuel in that reactor. The high oxygen percentage ensures optimum removal of the residual amount of organic components and sulphide. From the reactor 5 the material is passed to the cooler 7, prior to being discharged as calcined product at the outlet 12. The spent, hot cooler air is reused as combustion air in the reactor 3.

Experience gained from experiments with the process has shown that choice of calcining temperature in the two reactors constitutes a critical parameter as for each raw material there is only one optimum reaction temperature. If the temperature chosen is too high it will cause sintering together and rearrangement of the crystals in the treated conglomerate of carbonate-apatite, whereby the pores and cracks in the conglomerate are gradually closed, thus preventing the oxygen molecules from penetrating to the organic components and the sulphide to be converted. If too low a temperature is chosen, the desired processes will proceed slowly and demand a very long retention time in the reactors, and at the same time the low temperature does not ensure sulphide removal at anything like the same rate that it causes formation of new sulphide in the material.

The optimum reaction temperature for the process must thus be sought in the range 700°-850° C., the lowest temperature being chosen for geologically young raw phosphates, and the highest for old raw phosphates. Furthermore, it has been found that this optimum temperature serves to retain a suitable residual $CO_2$ content in the carbonate-apatite, by which is ensured a suitable reactivity in the "attack"-tank used for the phosphoric acid production. In addition the $CO_2$ developed by contact with the acid can contribute towards a desired cooling during the acid production. The following experimental data are examples of what can be achieved by two stage calcining as compared with one-stage calcining:

|  | % C | % sulphide | % $CO_2$ | % $P_2O_5$ | BET ($m^2/g$) |
|---|---|---|---|---|---|
| Raw material, dry | 1.8 | 0.02 | 5.3 | 30.5 | 15.0 |
| Calcined once in suspension conveying reactor at 750° C., 2 sec. | 0.40 | 0.08 | 4.8 | 32.5 | 8.0 |
| Calcined once in fluid-bed at 750° C., 20 min. | 0.15 | 0.06 | 3.5 | 33.2 | 3.5 |
| Calcined once in suspension transport reactor at 900° C., 2 sec. | 0.09 | 0.23 | 1.5 | 34.4 | 0.6 |
| Two-stage treated at 750° C. 2 sec/20 min. | 0.05 | 0.02 | 2.0 | 34.0 | 2.0 |
| 2 —/10 — | 0.15 | 0.02 | 3.5 | 33.1 | 4.6 |
| 2 —/5 — | 0.17 | 0.02 | 4.4 | 33.0 | 4.9 |

The raw material is Moroccan Youssoufia-phosphate which further has a moisture content of 15-18%, which must be dried away before calcination is initiated. By one-stage treatment in flash it is possible, at approximately 750° C., to achieve a product which is fairly acceptable as to sulphide, but the carbon and $CO_2$ content are high. Attempts to decompose the latter by raising the temperature to e.g. 900° C. will cause the sulphide content to grow to a quite unacceptable level, whereas the BET-value decreases strongly. By one-stage calcining in fluid-bed with retention time 20 min. at 750° C. is achieved an acceptable product, but by a process having an extremely high power consumption. Only by two-stage treatment according to the invention are simultaneously achieved acceptable combinations of low carbon, $CO_2$ and extremely low sulphide values. The power consumption by the method according to the invention is less than half the power consumption by the above fluid-bed.

I claim:

1. A method of burning away organic components in phosphate raw material, said method comprising the steps of
   (a) injecting said material into the bottom of a first stage vertical suspension reactor together with a first stream of gas containing combustion air such that the weight ratio of material/air is within the range 1-4,
   (b) suspending and entraining said material in said first gas stream by maintaining the velocity of said gas stream at from about 2 to about 10 m/sec. in the upward direction so as to form an upwardly moving suspension in said reactor having a density of 1-50 kg/m$^3$, (c) burning away a majority of said organic components in said first reactor at a reaction temperature of from about 700° C. to about 850° C., (d) removing said material from the top of said reactor and separating said material from said gas stream, (e) thereafter injecting said material into a second stage reactor together with a second stream of gas containing combustion air such that the weight ratio of material/air is within the range 2-30 and such that the amount of air injected into said first stage reactor is at least twice the amount of air injected into said second stage reactor, (f) suspending and entraining said material in said second gas stream by maintaining the velocity of said second gas stream at from about 0.05-5 m/sec. so as to form a second suspension having a density of 75-1600 kg/m$^3$, (g) burning away additional organic components from said material in said second stage reactor at a reaction temperature of from about 700° C. to about 850° C. during a material retention time in said reactor which is at least 4 times the material retention time in said first reactor, and (h) removing the material from the second stage reactor as a final product.

2. A method according to claim 1 including the steps of maintaining an oxygen percentage in the exit gas from the first reactor of from 0-4 and one half or less than the oxygen percentage in the exit gas from the second reactor.

3. A method according to claim 1 including the step of drying and preheating said raw material prior to the injection thereof into said first stage reactor with exit gas from at least one of said first stage reactor or said second stage reactor.

4. A method according to claim 1 including the step of supplying fuel to at least one of said first stage reactor or said second stage reactor.

5. Apparatus for burning away organic components in phosphate raw material, said apparatus comprising first and second series-coupled reactors, said first reactor being a suspension transport reactor having top and bottom portions and including means for injecting phosphate raw material, from a source other than material treated in said second reactor, and a stream of combustion air into the bottom thereof and for suspending said material in said air and conveying said suspension upwardly through said reactor, said first reactor further including exit means for removing gas-entrained material from the top thereof, separator means for separating said gas-entrained material removed from said first reactor from said gas, means for passing substantially all of said material from said separator means to said second reactor, said second reactor being a suspension reactor and including means for injecting into said reactor combustion air and said material from said separator, and means for removing material treated in said second reactor.

6. Apparatus according to claim 5 including means for preheating said raw material prior to the injection thereof into said first reactor, said means being adapted to use hot exit gases from at least one of said reactors for said preheating.

7. Apparatus according to claim 5 wherein said second reactor includes means for injecting a gas therein so as to maintain a fluidized bed of said gas and said material.

8. Apparatus according to claim 5 wherein said second reactor includes means for injecting gas therein so as to maintain a spouted bed of said gas and said material.

9. Apparatus according to claim 5 wherein said first suspension transport reactor is a tube-shaped vertical shaft having a conical bottom, said reactor including pipes opening into said bottom for the injection of raw phosphate material and fuel, an air supply pipe axially located in said bottom, and a pipe at the top for removing gas-entrained material therefrom.

* * * * *

UNITED STATES PATENT AND TRADEMARK OFFICE
CERTIFICATE OF CORRECTION

PATENT NO. : 4,605,370
DATED : August 12, 1986
INVENTOR(S) : Soren Hundebol

It is certified that error appears in the above-identified patent and that said Letters Patent are hereby corrected as shown below:

Column 1, line 16, "amoun" should be --amount--; line 56, "0.05-15" should be --0.05-5--. Column 2, line 35, "mew" should be --new--.

Signed and Sealed this

Ninth Day of December, 1986

Attest:

DONALD J. QUIGG

*Attesting Officer*  *Commissioner of Patents and Trademarks*